Patented Feb. 23, 1954

2,670,383

UNITED STATES PATENT OFFICE 2,670,383

COMPOUND SELECTED FROM THE GROUP CONSISTING OF THIO BIS[3-METHYL-6-(1,1,3,3,-TETRAMETHYL BUTYL) PHENOL] AND THIO BIS(3-METHYL-6-T-DODECYL PHENOL)

David J. Beaver, Richmond Heights, Mo., and George L. Magoun, Nitro, W. Va., assignors to Monsanto Chemical Company, St. Louis, Mo., a corporation of Delaware No Drawing. Application June 30, 1950, Serial No. 171,562

3 Claims. (Cl. 260—609)

This invention relates to a new class of compounds containing sulfur. More particularly the invention relates to a new class of sulfides of monohydric di-substituted phenols. The new products are useful as negative catalysts for inhibiting oxidation of organic substances which deteriorate by absorption of oxygen and are especially useful for the preservation of a rubber.

It is now known that the number, size, position and kind of substituting group exerts a profound influence on the antioxidant properties of substituted phenol sulfides. Some of these compositions are not rubber antioxidants at all whereas a few have been discovered which are powerful antioxidants having little tendency to discolor rubber. The products of the present invention have been tested and found to comprise a group belonging to this latter class of antioxidants.

The new compounds are sulfides of phenols having two nuclear substituents one of which is a hydrocarbon group in the meta position and at least one of the substituents contains more than five carbon atoms. Additionally, one of the substituents is a branched chain alkyl group. By branched chain alkyl group is meant a group branched at the carbon which is attached to the nucleus or in other words, secondary and tertiary alkyl groups but not alkyl groups which however branched have a primary carbon atom linked to the nucleus, as for example an iso hexyl group which contributes properties more like an n-alkyl group. The phenols which are preferred because they are readily prepared and also because their sulfides exhibit the greatest antioxidant strength are phenols obtained by introducing a secondary or tertiary alkyl group of at least six carbon atoms into meta ethyl or meta methyl phenol. Such phenols may be prepared by one of the familiar alkylation reactions in which a higher secondary or tertiary alcohol or olefine is condensed with the meta phenol in the presence of a condensing agent as for example, sulfuric acid, phosphoric acid, or boron trifluoride. The position of the entering alkyl groups have not been identified with certainty in every instance but the evidence indicates that they enter the 6-position predominately. Examples are 3-methyl secondary or tertiary hexyl, octyl, decyl and dodecyl phenol, 3-ethyl secondary or tertiary heptyl, octyl, nonyl, decyl and dodecyl phenol, 3-normal propyl and 3-isopropyl secondary or tertiary hexyl, heptyl, octyl, nonyl, decyl and dodecyl phenol.

The invention is not, however, limited to sulfides of phenols which are prepared from alkylated meta phenols but pertains generally to sulfides of 3,6-dialkyl substituted phenols containing a branched chain alkyl group and at least six carbon atoms in one of the alkyl groups. For example, another suitable starting material is 3-sec. hexyl 6-ethyl phenol, B. P. 133–142°/13 mm. Still others are 3-methyl 6-(4-methyl pentyl-2)-phenol, 3-ethyl 6-(4-methyl pentyl-2) phenol, 3-methyl 6-(3-ethyl pentyl-3) phenol, 3-ethyl 6-(3-ethyl pentyl-3) phenol and 3-ethyl 6-(2-methyl 4,4-dimethyl pentyl-2) phenol.

Sulfides of dialkyl phenols containing a total of nineteen carbon atoms in the side chains have been investigated and found to exhibit useful antioxidant properties. On the other hand, sulfides of phenols containing a total of more than thirteen carbon atoms in the side chains show a marked lowering in antioxidant activity.

In general, the sulfides of the higher dialkyl phenols are not crystallizable but are non-distillable liquids or resin-like compositions. They form readily in good yield from the phenols by reaction with a sulfur halide. The sulfur chlorides are convenient to use and are readily available for this purpose. Condensation of two molecular equivalents of the phenol with one molecular equivalent of sulfur dichloride produces a mono sulfide or mono thio bis phenol. Additional sulfur may be introduced into the molecule by increasing the ratio of sulfur dichloride or by substituting sulfur monochloride for sulfur dichloride. While the antioxidant effectiveness is not increased by increasing the sulfur content of the molecule, neither is it materially decreased until the sulfur ratio is greater than two atoms of sulfur for two dialkyl phenol radicals. Whether or not a disulfide linkage forms with higher sulfur content is not definitely known but the experimental evidence indicates as more probable that polymers are formed having more than two phenol groups linked together by sulfur atoms. Non-distillable oils and resins are of course exceedingly difficult to purify but this is unnecessary for most purposes as it is satisfactory to employ the composite reaction products directly as antioxidants. The reaction products whether from sulfur dichloride or sulfur monochloride probably contain some polymeric constituents. Thus, the term "a thio bis (di-nuclear substituted phenol)" is used in a generic sense to include products in which the ratio of the phenol radical to sulfur atoms varies from 2:1 to 1:1 and to even higher ratios of sulfur. The point at which sulfur is attached to the nucleus is not known definitely but it would be expected that the para position of a 3,6-dialkyl phenol would react first and if additional sulfur entered the nucleus it would probably be at the remaining ortho position.

The age resistors of this invention are new chemical products not described in the literature. Methods for their preparation are illustrated in the following examples but the invention is by no means limited thereto.

EXAMPLE 1

*Sulfide of octyl m-cresol*

Octyl m-cresol was prepared by alkylating meta cresol with di-isobutylene in the presence of sulfuric acid catalyst. Di-isobutylene is a mixture of 2,4,4-trimethyl-1-pentene and 2,4,4-trimethyl-2-pentene which are assumed to give identical alkylation products. The alkylated product believed to be 3-methyl-6-(1,1,3,3-tetramethyl butyl) phenol boiled at 130–140°/5 mm. The identical product was also prepared using boron trifluoride as the catalyst.

A solution of 22.7 parts by weight of sulfur dichloride in 50 parts by weight of a light petroleum solvent was gradually added to 88 parts by weight of the aforesaid 6-(1,1,3,3-tetramethyl butyl) meta cresol dissolved in 150 parts by weight of a light petroleum solvent. The temperature of the reaction mixture was kept below about 28° C. during the addition. Thio bis (3-methyl 6-(1,1,3,3-tetramethyl butyl) phenol) was obtained in substantially quantitative yield after removal of the solvent. It was a soft resin.

Substituting 29.8 parts by weight of sulfur monochloride for the sulfur dichloride in the above reaction produced a resinous composition having one sulfur atom present for each phenol radical.

EXAMPLE II

*Sulfide of dodecyl m-cresol*

Meta cresol was condensed with tri-isobutylene in the presence of boron trifluoride as catalyst, the fraction boiling at 140–165° C./3 mm. being collected. This fraction was believed to comprise essentially 3-methyl dodecyl phenol. The hydroxyl content of this compound would be 6.16% and determination of the hydroxyl content by Zerewitinoff's method of methane evolution gave 5.94% of the liquid fraction as hydroxyl group.

A solution of 11.3 parts by weight of sulfur dichloride in 20 parts by weight of a light petroleum fraction was gradually added to a solution of 55.2 parts by weight of the above dodecyl m-cresol in 100 parts by weight of a light petroleum fraction. The temperature was kept below 28° C. during the addition. The desired thio bis 3-methyl dodecyl phenol was obtained in substantially quantitative yield after removal of the solvent. It was a soft resin.

EXAMPLE III

*Sulfide of hexyl m-cresol*

Hexyl m-cresol was prepared by alkylating meta cresol with a mixture of methylene pentenes obtained by dehydrating methyl isobutyl carbinol over alumina at 371–390° F. According to van Risseghem [Bull. soc. chim. Belg. 42, 219–28 (1933)] and Henne et al. [J. Am. Chem. Soc. 66, p. 1649] dehydration of methyl isobutyl carbinol produces a mixtures of methyl pentenes comprising 4-methyl 1-pentene, 4-methyl 2-pentene and 4-methyl 3-pentene.

Alkylation of the meta cresol was carried out by flash distilling the methyl pentenes into a mixture of 540 parts by weight (substantially 5.0 molecular proportions) of m-cresol and 5.5 parts by weight of 93% sulfuric acid. After absorption of 159.5 parts by weight of the methyl pentenes the addition thereof was discontinued, the sulfuric acid catalyst neutralized with soda ash and the reaction mixture washed repeatedly with water and then distilled over soda ash. Water, unreacted meta cresol and a small amount of other low boiling materials were separated in the lower boiling fractions. The main fraction of 248 parts by weight distilled at 130–145°/2 mm. and was believed to be 3-methyl mixed hexyl phenol.

The monosulfide of the hexyl meta cresol so prepared was formed by adding to a soltuion of 28.3 parts by weight of sulfur dichloride in 50.0 parts by weight of a light petroleum fraction, 96 parts by weight of the mixed hexyl meta cresol dissolved in 150 parts by weight of a light petroleum fraction. The temperature was kept below about 28° C. during the addition. The product obtained after removal of the solvent was a thick viscous liquid. The yield of thio bis 3-methyl mixed hexyl cresol was substantially quantitative.

EXAMPLE IV

*Sulfide of nonyl m-cresol*

Nonyl m-cresol was prepared by alkylating meta cresol with the olefine obtained by dehydrating di-isobutyl caribnol over alumina. Tout has shown that dehydration of this alcohol results in the formation of 2,6-dimethyl-2-heptene [compt. rend. 211, 561–3 (1940)].

Alkylation of the meta cresol was carried out by slowly adding 283 parts by weight of 2,6-dimethyl-2-pentene to a mixture of 432 parts by weight of meta cresol and 4 parts by weight of 93% sulfuric acid. The olefine was added over a period of about 150 minutes while heating the reaction mixture at 110–124° C. The reaction mixture was then cooled and after neutralization of the acid catalyst, washed repeatedly with water. Water and unreacted constituents were removed and the alkylated m-cresol isolated by distillation under reduced pressure. The fraction collected, 249.3 parts by weight boiling at 141–146° C./5 mm. was believed to be 3-methyl mixed nonyl phenol and probably principally 3-methyl (3,6-dimethyl heptyl-2) phenol.

The monosulfide of the mixed nonyl m-cresol was formed by adding a solution of 28.3 parts by weight of sulfur dichloride in 50.0 parts by weight of a light petroleum fraction to 117 parts by weight of the 2,6-dimethyl heptyl m-cresol dissolved in 150 parts by weight of a light petroleum fraction. The temperature was kept below about 28° C. during the reaction. The desired thio bis (3-methyl mixed nonyl phenol) was obtained in substantially theoretical yield as a thick viscous liquid after removal of the solvent.

EXAMPLE V

*Sulfide of tert. butyl m-phenyl phenol*

Meta phenyl phenol was butylated by passing isobutylene through 52.4 parts by weight of m-phenyl phenol in the presence of concentrated sulfuric acid as catalyst. The reaction was continued to about 70% completion before the efficiency of butylation dropped so low as to warrant continuation inadvisable. The butylated product was separated from the unreacted m-phenyl phenol by taking advantage of the differential caustic solubility. The partially butylated reaction mixture was dissolved in a petroleum solvent comprising predominately heptanes and filtered from a small amount of insolubles. The solution was extracted repeatedly with 5% aqueous sodium hydroxide and the caustic extracts in turn washed with a small amount of the solvent and added to the main solvent portion of alkali insolubles. The latter were finally washed with water until the washings were neutral and the solvent removed by distillation. The butylated m-phenyl phenol was then purified by recrystallization from petroleum ether. It melted at 88–90° C.

Fifteen parts by weight of the tert. butyl m-phenyl phenol was dissolved in 300 parts by weight of a petroleum fraction consisting predominately of heptanes. To the solution so prepared a solution of 3.1 parts by weight of sulfur dichloride in 20 parts by weight of the same solvent was added slowly with efficient stirring. The temperature of the reaction mixture was controlled at approximately 23° C. The reaction mixture was filtered to remove a small portion of insolubles and the solvent partially removed by distillation and the concentrated solution added to water and diluted with ether. The ether petroleum solvent solution was washed thoroughly with water and then dried over anhydrous calcium chloride, filtered and the solvent removed by distillation. The residue comprising the desired thio bis (3-phenyl tert. butyl phenol) was a gummy solid.

EXAMPLE VI

*Sulfide of tert. butyl m-pentadecyl phenol*

The intermediate for the preparation of this sulfide was prepared by butylating 3-pentadecyl phenol in the presence of sulfuric acid catalyst. Isobutylene was passed through a mixture of 257.6 parts by weight of 3-pentadecyl phenol and 2.5 parts by weight of 93% sulfuric acid at 110° C. The acid catalyst was neutralized after the gain in weight was substantially 44 parts by adding 3 parts by weight of dry soda ash and continuing the stirring for about an hour at 100° C. The mixture was then filtered hot directly into a distillation apparatus. Low boiling constituents were removed by distillation and the fraction boiling at 241–250° C./5 mm. was collected.

Seventy-six parts by weight of the above described butyl m-pentadecyl phenol was dissolved in 150 parts by weight of a petroleum fraction consisting predominately of heptanes to which was added a solution of 14.2 parts by weight of sulfur dichloride in 25 parts by weight of the petroleum solvent. The temperature was kept below 25° C. during the reaction. The solvent was removed by distillation up to a liquid temperature of 120° C./5 mm. The residue comprising the desired thio bis (3-pentadecyl tert. butyl phenol) was a viscous liquid.

The dialkyl phenol sulfides of this invention are highly compatible with a rubber including reclaimed rubber, balata, gutta percha and synthetically prepared rubbers, as for example GR–S rubber, a copolymer of butadiene and styrene, probably because of the presence of the long alkyl groups. The method of treating a rubber may vary. Thus the antioxidants may be incorporated by milling, added to the latex before coagulation or applied to the surface of a mass of crude or vulcanized elastomer. Neither strongly acidic nor strongly basic groups are present so that the curing properties of the rubber compounds are not altered. They are particularly valuable for use in connection with the manufacture of white rubber goods since they cause no discoloration of light colored rubber goods. Amounts within the range of 0.5%–3.0% on the solid elastomer are preferred but useful results may be achieved by amounts outside this range.

As examples of their valuable properties as antioxidants rubber stocks were compounded comprising:

| | Parts by weight |
|---|---|
| Smoked sheet rubber | 100 |
| Zinc oxide | 60 |
| Lithopone | 20 |
| Sulfur | 2 |
| Diphenyl guanidine phthalate | 0.675 |
| Benzoyl thio benzothiazole | 0.825 |
| Paraffin | 0.250 |
| Antioxidant | 1.0 |

The rubber stocks so compounded were vulcanized by heating for various periods of time in a press at 126 C. and artifically aged by heating in a bomb under 80 pounds air pressure per square inch for 12 hours at 121° C. The average tensile strength for the various cures before and after aging was determined, the percentage of the original tensile retained after aging being a measure of the antioxidant properties. The ratio of these values to that tensile retained by a stock similarly treated and identical in every respect except that is contained no antioxidant may be taken as a rating of the antioxidant. However, stocks containing no antioxidant are subject to wide variance in tensile after aging. They are much more erratic than a stock containing a good antioxidant, consequently the error introduced by a single determination may be considerable. Since the tensile retained after aging by the above described stock containing a standard commercial antioxidant of the phenolic sulfide class was known with considerable precision from a large number of independent determinations carried out over a period of years and in each instance the corresponding value for the blank stock containing no antioxidant had been determined, the rating of the commercial antioxidants could be assigned with considerable confidence by averaging the ratios of the percentage of tensile retained to those of the blank stock for a large number of determinations. In each experiment which included a stock containing one of the new antioxidants there was also included a stock containing the standard commercial antioxidant as well as the blank and the percentage of the original tensile retained after aging was compared to that of the stock containing the commercial antioxidant instead of to the blank. In effect then a figure was obtained which represented the percentage of the commercial antioxidant instead of the percentage of the blank. Knowing from the statistical study the rating of the commercial antioxidant based on the blank as 100, the results were multiplied by this factor to give the rating of the experimental products based on the blank as 100 but without introducing the error inherent in a single determination of the blank. The results are set forth in the table below:

Table

| Antioxidant | Percent Tensile Retained as Compared to stock Without Antioxidant |
|---|---|
| None | 100 |
| Thio bis(3-methyl mixed hexyl phenol) | 185 |
| Thio bis(3-methyl-6-(1, 1, 3, 3-tetramethyl butyl) phenol) | 203 |
| Thio bis(3-methyl mixed nonyl phenol) | 194 |
| Thio bis(3-methyl-t-dodecyl phenol) | 198 |
| Thio bis(3-pentadecyl t-butyl phenol) | 181 |

As illustrated by these data the compounds containing a higher secondary or tertiary alkyl group probably in the 6-position in addition to a short chain alkyl group in the 3-position are powerful antioxidants. Dialkyl compounds in which the large group is in the 3-position are nearly as effective. Other compounds having a large group in one of these positions still retain antioxidant activity although of a lower order.

It will be apparent that modifications can be made in the specific details and embodiments recited above for purposes of illustration. Preparation of the new compounds in an inert solvent has been described but this is unnecessary and direct condensation in the absence of a solvent has been successfully carried out. The new products while primarily intended for the protection of rubber may be used with other compositions which deteriorate by absorption of oxygen from the air, as for example mineral oils, vegetable oils, soap, paint and varnish and the like.

What is claimed is:
1. Thio bis (3-methyl 6-(1,1,3,3-tetramethyl butyl) phenol).
2. Thio bis (3-methyl 6-t-dodecyl phenol).
3. A compound selected from the group consisting of thio bis[3-methyl-6-(1,1,3,3-tetramethyl butyl) phenol] and thio bis(3-methyl-6-t-dodecyl phenol).

DAVID J. BEAVER.
GEORGE L. MAGOUN.

References Cited in the file of this patent
UNITED STATES PATENTS

| Number | Name | Date |
|---|---|---|
| 2,364,338 | Beaver | Dec. 5, 1944 |
| 2,374,559 | Morris et al. | Apr. 24, 1945 |
| 2,398,253 | Rogers et al. | Apr. 9, 1946 |
| 2,451,345 | McNab et al. | Oct. 12, 1948 |
| 2,518,379 | Rogers et al. | Aug. 8, 1950 |
| 2,560,049 | Cook | July 10, 1951 |
| 2,560,050 | Cook | Jan. 8, 1952 |